United States Patent
O'Donnell

(10) Patent No.: US 7,463,261 B1
(45) Date of Patent: Dec. 9, 2008

(54) THREE-DIMENSIONAL IMAGE COMPOSITING ON A GPU UTILIZING MULTIPLE TRANSFORMATIONS

(75) Inventor: Daniel O'Donnell, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 325 days.

(21) Appl. No.: 11/117,944

(22) Filed: Apr. 29, 2005

(51) Int. Cl.
G06T 15/10 (2006.01)
(52) U.S. Cl. .............. 345/427; 345/420; 345/426; 345/586; 345/647; 345/648; 345/649; 345/672
(58) Field of Classification Search .......... 345/420, 345/421, 426, 427, 586, 647, 648, 649, 672
See application file for complete search history.

(56) References Cited

U.S. PATENT DOCUMENTS

| | | | |
|---|---|---|---|
| 5,675,773 A | 10/1997 | Devic | |
| 6,016,150 A | 1/2000 | Lengyel et al. | |
| 6,028,583 A | 2/2000 | Hamburg | |
| 6,466,210 B1 | 10/2002 | Carlsen et al. | |
| 6,717,576 B1 * | 4/2004 | Duluk et al. | 345/419 |
| 6,809,745 B1 | 10/2004 | O'Donnell et al. | |
| 7,236,169 B2 * | 6/2007 | Barone et al. | 345/421 |
| 2002/0003541 A1 | 1/2002 | Boyd et al. | |

OTHER PUBLICATIONS

Foley, James D., (Book)—Computer Graphics Principles and Practice, 2nd Edition in C,(1997) pp. 203, 207, 208 and 835.*

Abram, Gregory D., et al., "Building block shaders", *Proceedings of the 17th Annual Conference on Computer Graphics and Interactive Techniques*, (1990),283-288.
Adobe, "Adobe After Effects", *Adobe After Effects 5.5 Effect PDFs*, Table of effects in after effects 5.5,1-5.
Adobe, "Chapter 7—Transparency", *PDF Reference, Fifth Edition, Version 1.6,* http://partners.adobe.com/public/developer/pdf/index_reference.html#5,(2004),483-545.
Adobe, "Effects, part 1", *Adobe After Effects 5.0*, 1-45.
Adobe, "Effects, part 2", *Adobe After Effects 5.0*, 1-31.
Adobe, "Effects, part 3", *Adobe After Effects 5.0*, 1-20.
Adobe, "Effects, part 4", *Adobe After Effects 5.0*, 1-32.
Adobe, "Effects, part 5", *Adobe After Effects 5.0*, 1-26.
Adobe, "Effects, part 6", *Adobe After Effects 5.0*, 1-29.
Adobe, "Effects, part 7", *Adobe After Effects 5.0*, 1-13.
Bardens, Ben, "After Effects Using Track Mattes", *Editors Guild Magazine*, Reprinted from The Editors Guild Magazine vol. 24, No. 2-Mar./Apr. 2003,1-4.

(Continued)

*Primary Examiner*—Kimbinh T Nguyen
(74) *Attorney, Agent, or Firm*—Schwegman, Lundberg & Woessner, P.A.

(57) ABSTRACT

A method includes performing a first transform operation with respect to an image element to transform the image element from an object space, defined by an object coordinate system, to an intermediate space defined by an intermediate coordinate system. A first computational operation is performed with respect to the image element in the intermediate space. A second transform operation is performed with respect to the image element to transform the image element from the intermediate space to a world space, defined by a world coordinate system. A second computational operation is performed with respect to the image element in the world space.

11 Claims, 10 Drawing Sheets

OTHER PUBLICATIONS

Berger, Christopher, "A Flexible Framework for Hardware-Accelerated High-Quality Volume Rendering", *Technical Report TR-VRVis-2003-001, VRVis Research Center*, (2003),1-10.

Birn, Jeremy, "Render Passes, Layers, and 3D Compositing", *3d Compositing at 3rRender.com*, http://www.3drender.com/light/compositing/, From the book Digital Lighting & Rendering,(2000),1-4.

Blinn, J F., "Compositing. 1. Theory", *IEEE Computer Graphics & Applications*, 14(5), (Sep. 1994),83-87.

Blinn, J F., "Composting, part 2: practice", *IEEE Computer Graphics and Applications*, 14(6), (Nov. 1996),78-82.

BSP-FAQ, "Binary Space Partitioning Trees FAQ", http://www.faqs.org/faqs/graphics/bsptree-faq/, (Sep. 26, 1995),Web Page.

Callahan, Steven P., "Hardware-Assisted Visibility Sorting for Unstrucred Volume Rendering", *SCI Institute Technical Report.*, The University of Utah,(Jun. 14, 2004),1-9.

Carpenter, Loren, "The A -buffer, an antialiased hidden surface method", *International Conference on Computer Graphics and Interactive Techniques, Proceedings of the 11th annual conference on Computer graphics and interactive techniques*, (1984),103-108.

Chin, Norman, et al., "Near real-time shadow generation using BSP trees", *Proceedings of the 16th Annual Conference on Computer Graphics and Interactive Techniques*, (Jul. 1989),99-106.

Chrysanthou, Y, et al., "Computing Dynamic Changes to BSP Trees", *EUROGRAPHICS '92 Proceedings*, 11(3), (Sep. 1992),321-332.

Crow, Franklin C., "Shadow algorithms for computer graphics", *International Conference on Computer Graphics and Interactive Techniques, Proceedings of the 4th annual conference on Computer graphics and interactive techniques*, (1977)242-248.

Dachille, Frank, "Architectures for Realistic Volume Imaging", *Preliminary Exam, SUNY at Stony Brook*, (1999),1-63.

Elinas, Pantelis, "Real-time rendering of 3D clouds", *Journal of Graphics Tools*, 5(4), (Nov. 2000),33-45.

Everitt, Cass, "Interactive Order-Independent Transparency", http://developer.nvidia.com/object/Interactive_Order_Transparency.html, (May 15, 2001),1-11.

Foley, James D., "List-Priority Algorithms", *(Book)—Computer Graphics: Principles and Practice*, 2nd Edition,(1990),672-680.

Franklin, Curt, "How 3-D Graphics Work", http://computer.howstuffworks.com/3dgraphics.htm/printable, 1-11.

Fuchs, Henry, et al., "Near real-time shaded display of rigid objects", *Proceedings of the 10th Annual Conference on Computer Graphics and Interactive Techniques*, (1983)65-72.

Fuchs, Henry, et al., "On Visible Surface Generation by A Priori Tree Structures", *Computer Graphics, SIGGRAPH '80*, (1980),124-133.

Fuchs, Henry, et al., "Predetermining Visibility Priority in 3-D Scenes", *Computer Graphics, SIGGRAPH '79*, 13(2), (Aug. 1979),175-181.

Guenter, Brian, et al., "Specializing shaders", *Proceedings of the 22nd Annual Conference on Computer Graphics and Interactive Techniques*, (1995),343-350.

Iverson, Jason, "Tutorials", http://www.odforce.net/tips/shaderwriting2.php, 1-3.

Kniss, Joe, et al., "Interactive Volume Rendering Using Multi-Dimensional Transfer Functions and Direct Manipulation Widgets", *Scientific Computing and Imaging Institute, School of Computing, University of Utah*, 8 pgs.

McCool, Michael, et al., "Shader Algebra", *ACM Transactions on Graphics (TOG), Special Issue: Proceedings of the 2004 SIGGRAPH Conference*, 23(3), (2004),787-795.

Parent, Rick, "Chapter 3 Display Considerations", http://www.oopweb.com/Graphics/Documents/companim/Volume/Dspl..., (1998),1-4.

Porter, Thomas, et al., "Compositing digital images", *International Conference on Computer Graphics and Interactive Techniques, Proceedings of the 11th annual conference on Computer graphics and interactive techniques*, (1984),253-259.

Stewart, Nigel, "Real-Time Rendering and 3D Games Programming", *COSC1224/1226, RMIT School of Computer Science and Information Technology*, (Sep. 25, 2003),1-40.

Thomas, Spencer W., "Decomposing a Matrix Into Simple Transformations", *In: Graphics Gems II by James Arvo*, Boston : Academic Press,(1991),320-323.

"Game Programming Gems 5", *Game Programming Gems 5, Charles River Media, Inc.*, (2005),70 pgs.

"GPUGems—Programming Techniques, Tips, and Tricks for Real-Time Graphics", *GPUGems—Programming Techniques, Tips and Tricks for Real-Time Graphics*, Addison-Wesley, 40 pgs.

"GPUGems2—Programming Techniques for High-Preformance Graphics and General-Purpose Computation", *GPUGems 2—Programming Techniques for High-Preformance Graphics and General-Purpose Computation*, Addison-Wesley, (2005),46 pgs.

Chartrand, Gary, et al., "Applied and algorithmic graph theory", New York : McGraw-Hill, (1993),30 pgs.

McCool, Michael, "Metaprogramming GPUs with Sh", Wellesley, MA : A K Peters, Book xvii,,(2004), 60 pgs.

McCool, Michael, "Shader metaprogramming", *Proceedings of the ACM SIGGRAPH/EUROGRAPHICS conference on Graphics hardware*, Revised Paper,(Sep. 1-2, 2002),pp. 1-12.

Meyer, Trish, et al., "Creating Motion Graphics with after effects", *vol. 1: The Essentials, 3rd Edition, CMP Books*, 104 pgs.

Rost, Randy, "OpenGLA® Shading Language", Reading, MA : Addison-Wesley, (Feb. 20, 2004),47 pgs.

U.S. Appl. No. 11/118,216 Response to Non-Final Office Action filed Jun. 21, 2007, 17 pgs.

Foley, J D., "List-Priority Algorithms", *Book—Computer Graphics Principles and Practise*, 2nd Edition in C,(1997),672-680.

Meyer, T., et al., "Creating Motion Graphics with after effects", *vol. 1: The Essentials, 3rd Edition, CMP Books*, 34.

U.S. Appl. No. 11/118,216 Non-Final Office Action mailed Apr. 4, 2007, 21 pgs.

U.S. Appl. No. 11/118,216 Response filed Jun. 21, 2007 to Non-Final Office Action mailed Jun. 18, 2007, 16 pgs.

Foley, J D., List-Priority Algorithms, *Book—Computer Graphics Principles and Practise*, 2nd Edition in C,(1997), 672-680.

Meyer, T., et al., Creating Motion Graphics with after effects, *vol. 1: The Essentials, 3rd Edition, CMP Books*, (2000), 34.

* cited by examiner

THREE-DIMENSIONAL IMAGE COMPOSITING ON A GPU UTILIZING MULTIPLE TRANSFORMATIONS

TECHNICAL FIELD

The present application relates generally to computer graphics processing, and in one example embodiment to a method and apparatus for processing and/or manipulating data for presentation by a computer system.

BACKGROUND

Recent innovations with respect to Graphics Processing Units (GPUs), and graphics cards hosting GPUs, have enabled increasingly fast image compositing operations. Turning first to two-dimensional compositing operations, these can now typically be performed using shading languages designed to run on a GPU. For example, given a set of images, a compositing order, and a compositing operation for each image, the GPU enables the copying of a background image from a frame buffer to a video memory (e.g., one or more texture processing units) of the GPU. The GPU may then use the background image and associated alpha channel information, along with a foreground texture and associated alpha channel information, to produce another background image in the frame buffer. This process is repeated by the GPU for each foreground image. Complications can arise because of the limited resources of the GPU, and the time required to transfer images to the video memory. Many techniques are employed to minimize the transfer time and storage requirements.

Turning now to three-dimensional compositing, in contrast to two-dimensional compositing, three-dimensional compositing typically presents no fixed sorting order. Moreover, lighting effects (e.g., shadows) are not typically present in two-dimensional compositing and require a texture processing unit for shadow casting lights. Trackmattes also usually need a dedicated texture processing unit, and compositing also requires two textures coordinate processing unit, one for the background and one for the foreground. In view of the demand for texture processing units for the processing of effects, single pass algorithms for 3D compositing on a GPU may exceed the resources (e.g., the number of available texture processing units) of the GPU. If resource limits are exceeded, either effects need to be dropped, or alternatively the GPU will fail to render the scene. In the case where the GPU fails to render a scene, rendering of the scene may need to be assumed in software executing on the CPU.

The above described consumption of resources is increased substantially when a large number of lighting sources are present in an image to be rendered, as a texture processing unit is required for each and every shadow casting light.

SUMMARY

According to one example aspect, a method includes performing a first transform operation with respect to an image element to transform the image element from an object space, defined by an object coordinate system, to an intermediate space defined by an intermediate coordinate system. A first computational operation is performed with respect to the image element in the intermediate space. A second transform operation is performed with respect to the image element to transform the image element from the intermediate space to a world space, defined by a world coordinate system. A second computational operation is performed with respect to the image element in the world space.

BRIEF DESCRIPTION OF THE DRAWINGS

Embodiments of the invention may be best understood by referring to the following description and accompanying drawings which illustrate such embodiments. In the drawings.

DETAILED DESCRIPTION

Methods, apparatus and systems for three-dimensional image compositing on a GPU utilizing multiple transformations are described herein. In the following description, numerous specific details are set forth. However, it is understood that embodiments of the invention may be practiced without these specific details. In other instances, well-known structures and techniques have not been shown in detail in order not to obscure the understanding of this description. Additionally, in this description, the phrase "example embodiment" means that the embodiment being referred to serves as an example or illustration.

In one example embodiment, a technique is described that utilizes a combination of Central Processing Unit (CPU) and Graphics Processing Unit (GPU) processing to accelerate the compositing of three-dimensional images (e.g., scene images). In this embodiment, at least a partial preparation of image elements, in the example form of image layers, for GPU processing is handled by the CPU. The rendering of each image layer is then performed by the GPU.

In the example embodiment, the disclosed technique identifies image elements (e.g., layers) within, or that are to form part of, a three-dimensional image (e.g., three-dimensional scene). One aspect of the technique splits at least a subset of these layers into image pieces, and then sorts these image pieces on the CPU. Optionally, shadow maps for the image elements may also be constructed. In one embodiment, for each image layer, the technique may further, on the CPU, dynamic assemble a GPU program, in the example form of a shader, which computes one or more effects with respect to the associated image element. In another embodiment, GPU programs may be manually scripted, stored and then identified for use in computing one or more effects for a respective image element. Such effects may include motion blur, trackmatte, or lighting effects. The same GPU program may also implement an appropriate blending (or compositing) mode by operationally blending a resultant color with a background color according to a specified blending (or compositing) mode. The GPU program for each image element is accordingly executed by the GPU to apply one or more effects, (e.g., motion blur, trackmatte, lighting, etc), applicable to a respective image element, and to composite the relevant image of an image.

For the purposes of the present specification, the term "image element" shall be taken to include, but not be limited to, image layers, image pieces, and image fragments that may be identified and/or generated by image processing software, firmware or hardware. In one example embodiment, an image element may comprise a convex polygon, which is described by a series of vertices. Accordingly, image elements may be defined by a series of vertices, which are processed by the CPU and/or the GPU.

Figure 1:
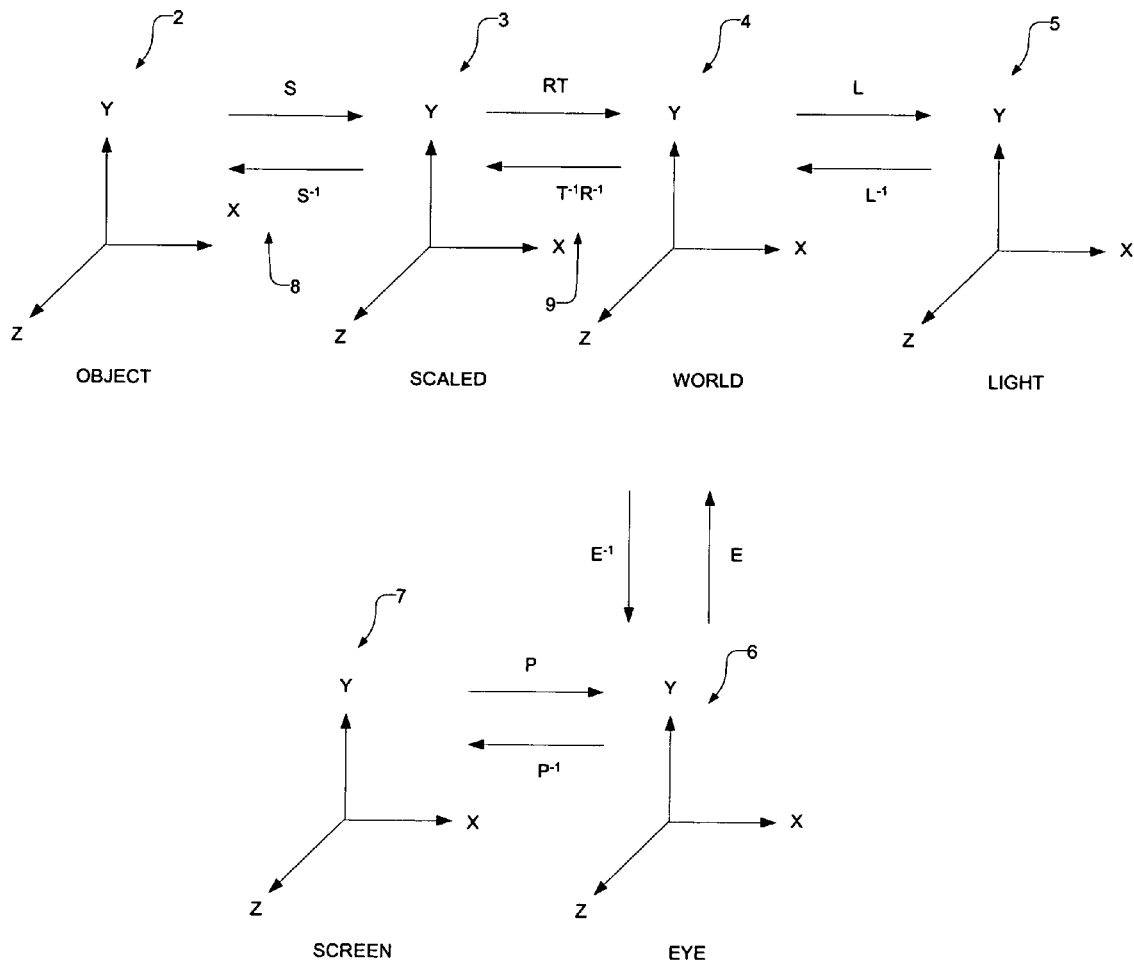
FIG. 1 is a diagrammatic representation of relationships between a number of coordinates systems, in which computations and processing may be performed in one example embodiment of the present invention.

FIG. 1 is a diagrammatic representation of the relationship between a number of coordinates systems, within which computations and/or processing may be performed in one example embodiment of the present invention. Each of the coordinates systems defines an identifiable space. A technique discussed below proposes, in one embodiment, rendering pipeline that constitutes a series of transformations through these identifiable spaces.

As an example embodiment of the present invention, an algorithm described below to enable three-dimensional compositing of a digital image utilizes a GPU, and consumes a number of texture processing units of the GPU. The example algorithm is based on the concept of "object-space" lighting, and provides for the handling of non-uniform scaling, non-uniform skew or both non-uniform scaling and skew of images, such non-uniformity in images being common in three-dimensional compositing. In the example embodiment, the algorithm renders a digital image in a scene from multiple coordinates systems.

FIG. 1 illustrates relationships between various coordinate systems that may be utilized in accordance with an example embodiment of the present invention. An object-coordinate system 2 is a three-dimensional coordinate system that defines a so-called "object-space". The object-space may be a three-dimensional space in terms of which an object is defined. In the exemplary embodiment, the object-coordinate system 2 defines a three-dimensional space in which the source image lies in a plane parallel to the xy-plane.

A world-coordinate system 4 is a three-dimensional coordinate system that defines a so-called "world-space". The world-space may be a three-dimensional space in terms of which an object is located in a three-dimensional "universe". Accordingly, in an exemplary embodiment, the world-space may be a three-dimensional space in which an object-image is scaled, rotated and translated with respect to other images.

In an eye-coordinate system 6, which defines an "eye space", the origin of world-space is taken to be a camera's origin, and the z-axis is along the view direction of the camera.

A light-coordinate space is a world-coordinate space in which a particular light source is at the origin of the xyz-axis. Finally, in a screen-coordinates space, a perspective distortion maybe applied.

In an example embodiment of the present invention, a transformation from the object-coordinate system 2 (object-space) to the world-coordinate system 4 (world-space) has been "split" into two stages. A first stage 8 applies a scale and/or a skew transform, while a second stage 9 applies a rotate and translate transform.

One aspect of the present invention proposes dividing processing of certain effects (e.g., light and shadow) from other computations (e.g., sampling, trackmattes and compositing). This has the advantage of making more texture processing units available for other processes and computations, as only a limited number are being used at any one time. For example, further texture processing units may be freed in this manner for use in processing depth of field blur, motion blur, etc).

With respect to the processing of light/shadow effects, it should be noted that images are typically scaled non-uniformly, and accordingly lighting equations may incorrectly calculate the shading in these cases. One method of addressing this issue is to render images in object-space, rather than in world-space. However, in order to render images in object-space, uniform scaling is required in order to produce correct results. With a view to addressing this problem, the below described algorithm proposes splitting the object-space to world-space transformation into two parts, namely the above-described scale/skew transform operation, and a rotate and translate transform operation. Accordingly, the algorithm proposes performing light calculations not in the object-space, but in an intermediate space, in the exemplary form of a scaled-space defined by the scaled-coordinate system 3, between object-space (defined by the object-coordinate system 2) and eye space (defined by the eye-coordinate system 6).

At a high level, an example algorithm proposes rendering an image in object-space (defined by an object-coordinate system 2), thereby accumulating lighting and shadowing. The new image is then transformed into a world-space (defined by a world-coordinate system 4), where further processing (e.g. trackmattes effect, motion blur effect, and compositing) are computed.

Figure 2:
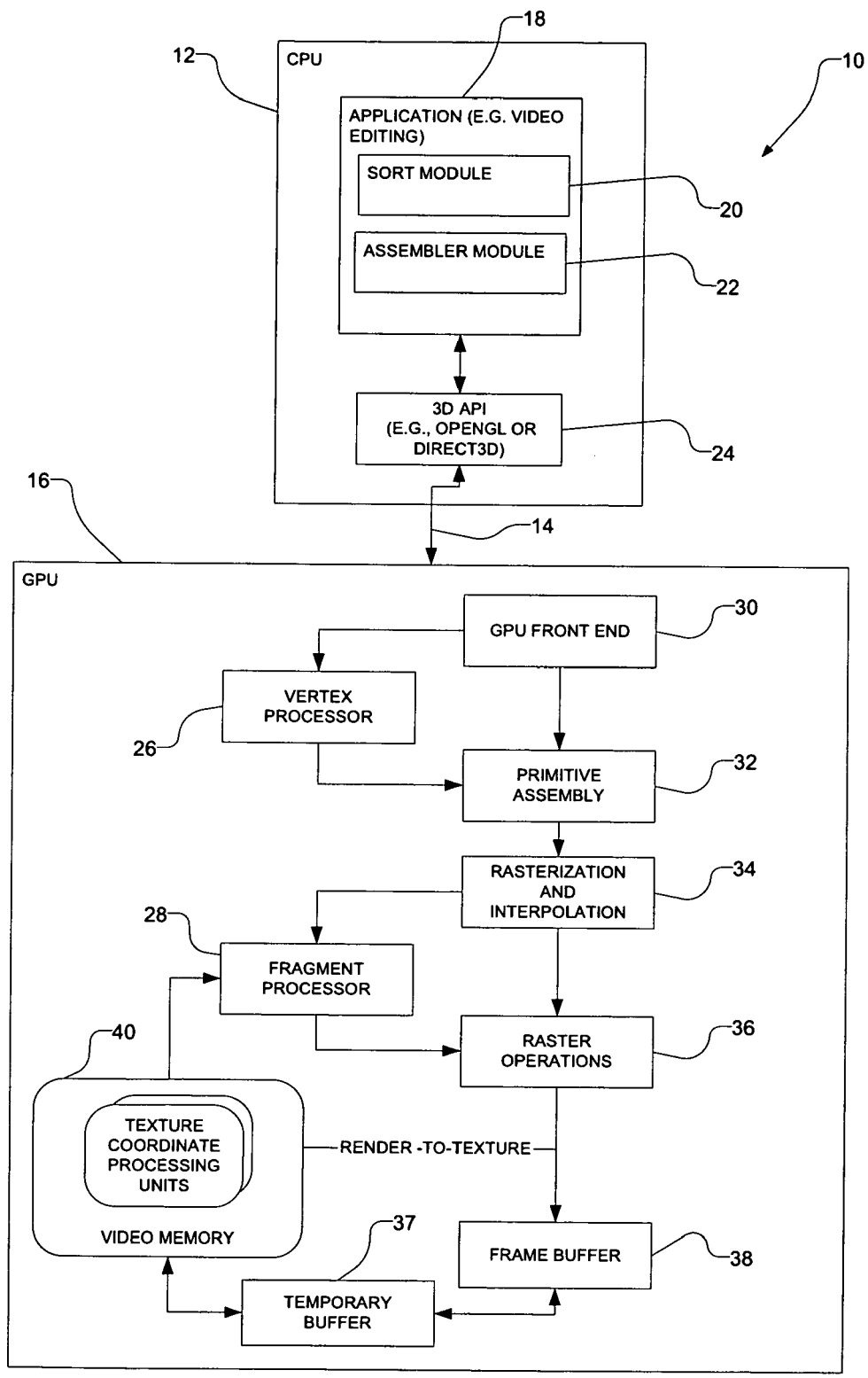
FIG. 2 is a block diagram illustrating a system, according to an example embodiment of the present invention, which may be a personal computer system (PC).

FIG. 2 is a block diagram illustrating a system 10 (e.g., a personal computer system (PC)), within which an example embodiment of the present invention may be implemented and/or executed. The system 10 includes a central processing unit (CPU) 12, which is coupled via an interconnect 14 (e.g., a bus) to a graphics processing unit (GPU) 16. While the CPU 12 and the GPU 16 may be embodied in separated and distinct integrated circuits, the units 12 and 16 may in one embodiment be formed on a single chip die, or in fact be implemented as a unitary integrated circuit. Accordingly, for the purposes of the present application, the terms CPU and GPU should be taken to refer to distinct processing domains, but not necessarily to distinct integrated circuits or components.

While the architecture of the CPU 12 is not explicitly illustrated, the CPU 12 is shown to execute a graphics processing application 18 (e.g., a video compositing or motion graphics application) that includes a sort module 20 and an assembler module 22. At a high level, in one example embodiment, the sort module 20 operates to split and sort image elements of a three-dimensional image scene, and the assembler module 22 operates to dynamically assemble a GPU program (if required) for each such image element. Details regarding the operations performed by the sort module 20 and the assembler module 22 are provided below. The image processor application 18 is furthermore shown to communicate with the GPU 16 via a 3D Application Program Interface (API) 24 (e.g., the OpenGL or the Direct3D APIs).

FIG. 2 also illustrates the logical architecture of an example GPU 16. The example GPU 16 is a stream processor that operates as the core computational unit for a graphics card, and has its own memory for the storage of image data and programs. The example GPU 16 is designed to handle geometric data and includes two types of processors, namely a vertex processor 26 and a fragment processor 28. Dealing more specifically with a graphics processing pipeline that may be implemented by the GPU 16, a GPU frontend 30 operationally receives image data and programs from the image processing application 18 executed by the CPU 12. Specifically, the image processing application 18 may issue 3D API commands to the 3D API 24, which in turn issues GPU commands, and an associated data stream, to the GPU frontend 30. The GPU frontend 30 provides pre-transformed vertices to the vertex processor 26. The vertex processor 26 is programmable, and typically executes a GPU program, in the form of a vertex shader, to generate and output transformed vertices to a primitive assembly pipe stage 32. The GPU frontend 30 also provides a vertex index stream to the primitive assembly pipe stage 32.

Assembled parameters are then communicated from the primitive assembly pipe stage 32 to a rasterization and interpolation pipe stage 34, which is supported by a rasterizer (not shown). Pre-transformed fragments are then provided from the rasterization and interpolation pipe stage 34 to the fragment processor 28, which in turn executes a further GPU program, in the example form of a fragment shader. The fragment processor outputs transformed fragments to a raster operations pipe stage 36. The rasterization and interpolation pipe stage 34 also outputs a stream of pixel locations to the raster operations. The raster operations then provide pixel updates to a frame buffer 38. The pixel updates are also provided to video memory 40, via a "render-to-texture" operation. To this end, the video memory 40 may be constituted by a collection of texture processing units, which are then again readable by the fragment processor 28 for image compositing operations.

The GPU 16 is also shown to include a temporary buffer 37, which may be utilized for the temporary accumulation of effects, or for various rendering operations as will be described in for the detailed below.

The various operations, computations and processing described below may be executed by a GPU program (e.g., including vertex and fragment components) and/or performed responsive to GPU commands perceived as the GPU 16 via the 3D API 24 from the CPU 12. Certain of the operations, computations and processing described below may also be performed on the CPU 12, in certain embodiments. It is recognized that the allocation of operations, computations and processing between the CPU 12 and the GPU 16 is, to a certain extent, fluid.

Figure 3:
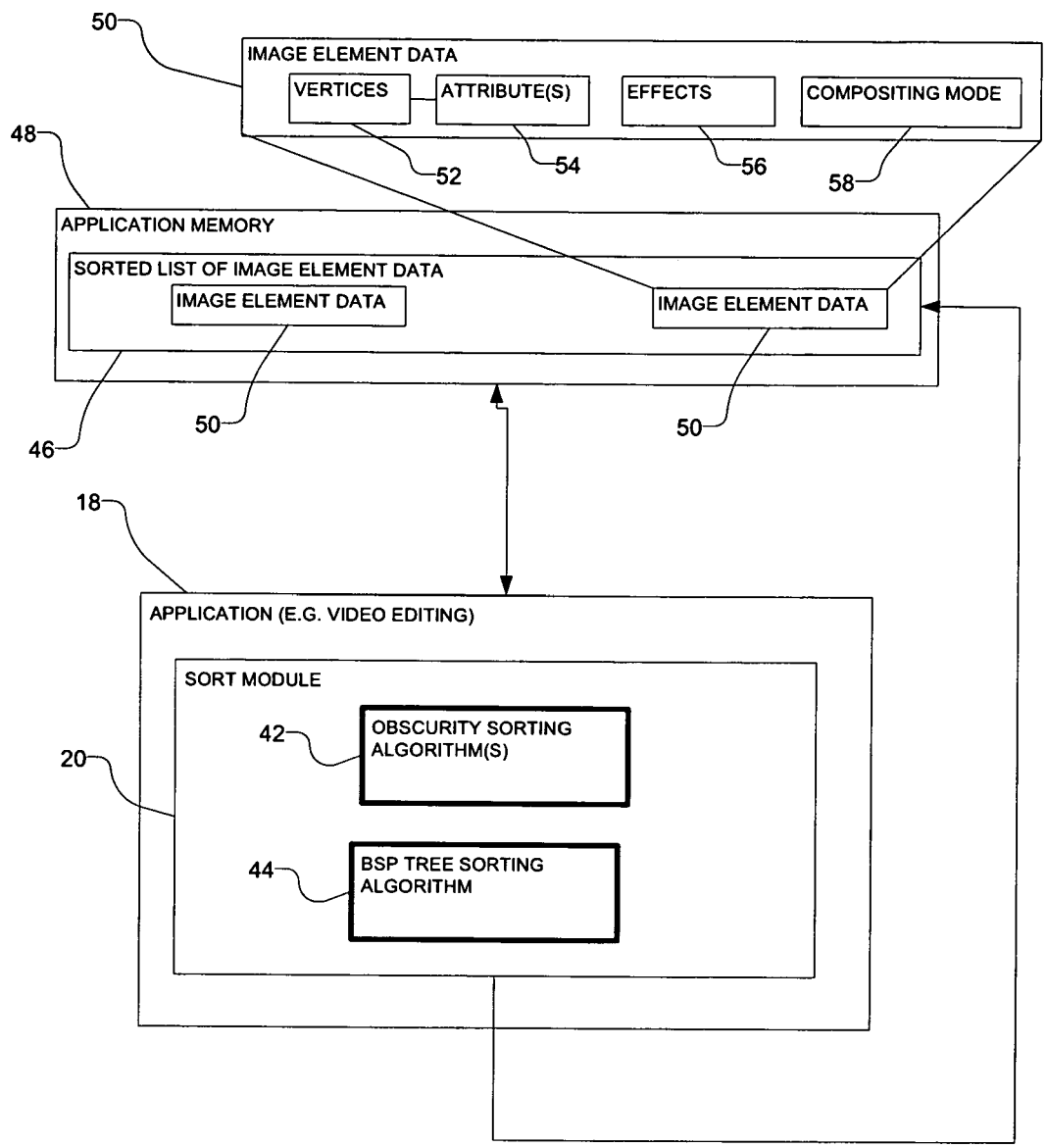
FIG. 3 is a block diagram illustrating further architectural details regarding an image processing application, and an associated application memory, as well as the architectural detail of certain data structures and specifically a sort module, according to one example embodiment of the present invention.

FIG. 3 is a block diagram illustrating further architectural details regarding the image processing application 18, and an associated application memory 48, as well as the architectural detail of certain data structures, according to one example embodiment of the present invention. The architectural details shown in FIG. 3 are pertinent to the splitting and sorting of image elements, as will be described in further detail below. The image processing application 18 is again shown to include the sort module 20, which in turn includes one or more depth sorting algorithms and/or obscurity sorting algorithms 42, and a Binary Space Partition (BSP) tree sorting algorithm 44. Operationally, the sort module 20 operates to generate a sorted list 46 of instances of image element data 50 (image elements), which is maintained within application memory 48. The sorted list 46 includes multiple instances of image element data 50, the instances of image element data 50 being sorted according to the order in which the image element data will be communicated to and processed by the GPU 16. Each instance of the image element data 50 is further shown to include one or more vertices 52 (e.g., defining a convex polygon) and associated attributes 54. The associated attributes may be effect specific. For example, motion blur, in an example embodiment, needs a two-dimensional vertex describing the apparent motion of each vertex over the time that the camera's shutter angle is open. This varies by vertex because perspective makes each vertex appear to move at a distinct rate. For trackmattes, each vertex needs a coordinate describing its location in the matte image. This coordinate may be the same as the coordinate of the vertex in the background image. Eye space position (a 3-vector) is another example of attribute information that may be associated with a vertex. This attribute information is needed for lighting equations. Other exemplary attributes may include depth of field (e.g., the z-coordinate of the eye space position), in accordance in light space for shadows (a 4-vector).

Each instance of image element data is furthermore shown to identify one or more effects (e.g., motion blur, trackmattes, lighting/shadowing, etc.) that are applicable to the image element data 50, and to identify a compositing mode applicable to a rendering of the relevant image element data 50.

Figure 4:
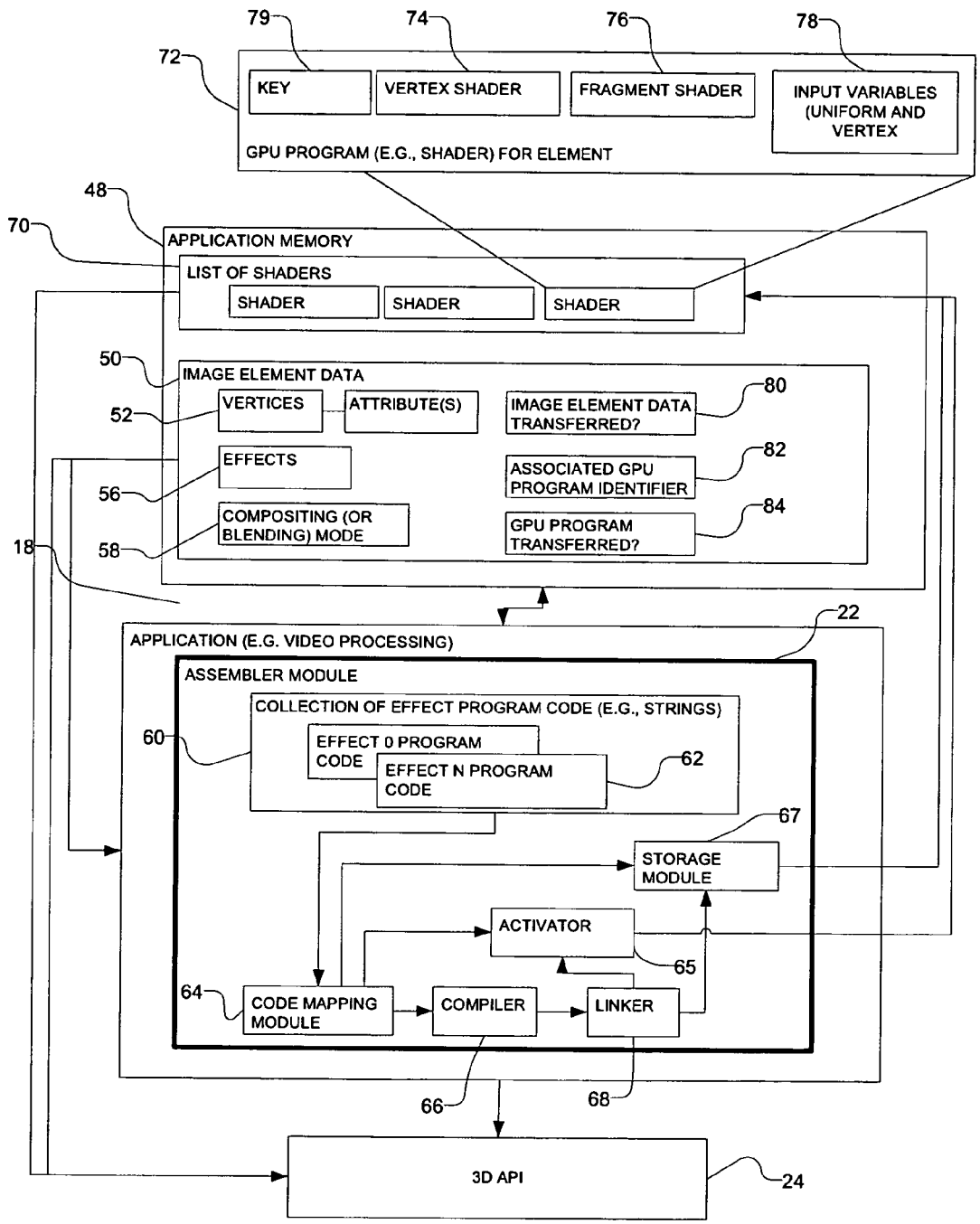
FIG. 4 is a block diagram illustrating further architectural details of an image processing application, and specifically an assembler module of such an application, and associated data structures, according to one example embodiment of the present invention.

FIG. 4 is a block diagram illustrating further architecture of an exemplary image processing application 18. FIG. 4 specifically illustrates the assembler module 22 of such an application 18, and associated data structures, according to one example embodiment of the present invention. The architecture described with reference to FIG. 4 is pertinent to an understanding of the dynamic assembly of a GPU program for an image element, which may be implemented in an example embodiment of the present invention. However, that should be noted that in an alternative embodiment GPU programs may be manually scripted, or otherwise generated, and may then be identified or activated when needed.

The assembler module 22 of the image processing application 18 is shown to include a collection 60 of effect program codes 62. Each instance of effect program code 62, in one example embodiment, is a string representing various subroutines needed to render an image element in accordance with a particular effect. For example, a first instance of effect program code 62 may render a motion blur effect, while a second instance of effect program code 62 may render a lighting effect. At a high level, the assembler module 22 operates to concatenate strings representing the various subroutines into a composite string that may be compiled into a GPU program (e.g., a shader). To this end, the assembler module 22 is shown to include a code mapping module 64 that determines, for a particular image element, the ordering of effects, and accordingly the order of various instances of effect program code 62 that are concatenated for compilation into a shader.

The code mapping module 64 is furthermore responsible for the generation and maintenance of a key 79 for each GPU program that is compiled. Accordingly, the code mapping module operates to map keys 79 to compiled GPU programs. Further details regarding the structure and generation of a key 79 are provided below. The code mapping module 64 is also coupled to an activator 65. In the event that the code mapping module 64 determines (using a key 79) that an appropriate GPU program 72 has already been compiled and stored on the GPU, the code mapping module 64, via the activator 65, causes the stored GPU program 72 to be activated. To this end, in one embodiment, the code mapping module 64 maintains a repository of keys 79 for GPU programs that are stored in the application memory 48 and/or that have been loaded to the GPU 16.

On the other hand, should a suitable GPU program 72 not already have been compiled and stored for a particular instance of image element data 50, the code mapping module 64 transfers an ordered list of strings to a compiler 66 and a linker 68 that operate to compile and link the strings. The appropriate vertex and uniform variables are assigned after the GPU program 72 is activated. A compiled shader is then stored, utilizing a storage module 67, in a list 70 of GPU programs 72, each GPU programs 72 in the list 70 thus constituting an example of a dynamically generated and compiled GPU program 72 that is associated with one or more instances of image element data 50. As mentioned elsewhere, a GPU program 72 suitable for rendering a particular instance of image element data 50 may also be suitable for rendering another instance of image element data 50, but possibly with different variables. Accordingly, the GPU program to image element data assignment may not necessarily be a unique, or one-to-one, assignment.

Each example GPU program 72 is further shown to include at least one of a vertex shader 74 for programming of the vertex processor 26 of the GPU 16, a fragment shader 76 for programming of the fragment processor 28 of the GPU 16, and multiple input variables (e.g., uniform and vertex variables) with which the CPU 12 programs the GPU 16.

FIG. 4 also illustrates that an instance of image element data 50, and an associated GPU program 72 (e.g., shader) are communicated from the application memory 48, via the 3D API 24, to the GPU 16. To this end, in one embodiment, the image element data 50 may include an indicator 80 of whether a particular instance of image element data 50 has been transferred to the GPU 16, an associated GPU program identifier 82 to enable an association of a particular instance of image element data 50 with a particular GPU program 72, and an indicator 84 of whether the associated GPU program 72 has been transferred to the GPU 16. The indicators 80 and 84 may be utilized by the application 18 to determine whether a particular instance of image element data 50, or an associated GPU program 72, have previously been transferred and are stored within the GPU 16.

In another embodiment, the data structures 80-84 may not be necessary because of the key 79. Also consider that multiple image elements in a particular three-dimensional scene may each have the same set of attributes making up a relevant key 79. In this case, the GPU program 72 would be the same for each image element, but the image element itself would of course be different. While the same GPU program 72 may be applicable and utilized to render each of these image elements, some of the vertex or uniform variables for the GPU program 72 would however be specific to a image element (e.g., position).

Figure 5:
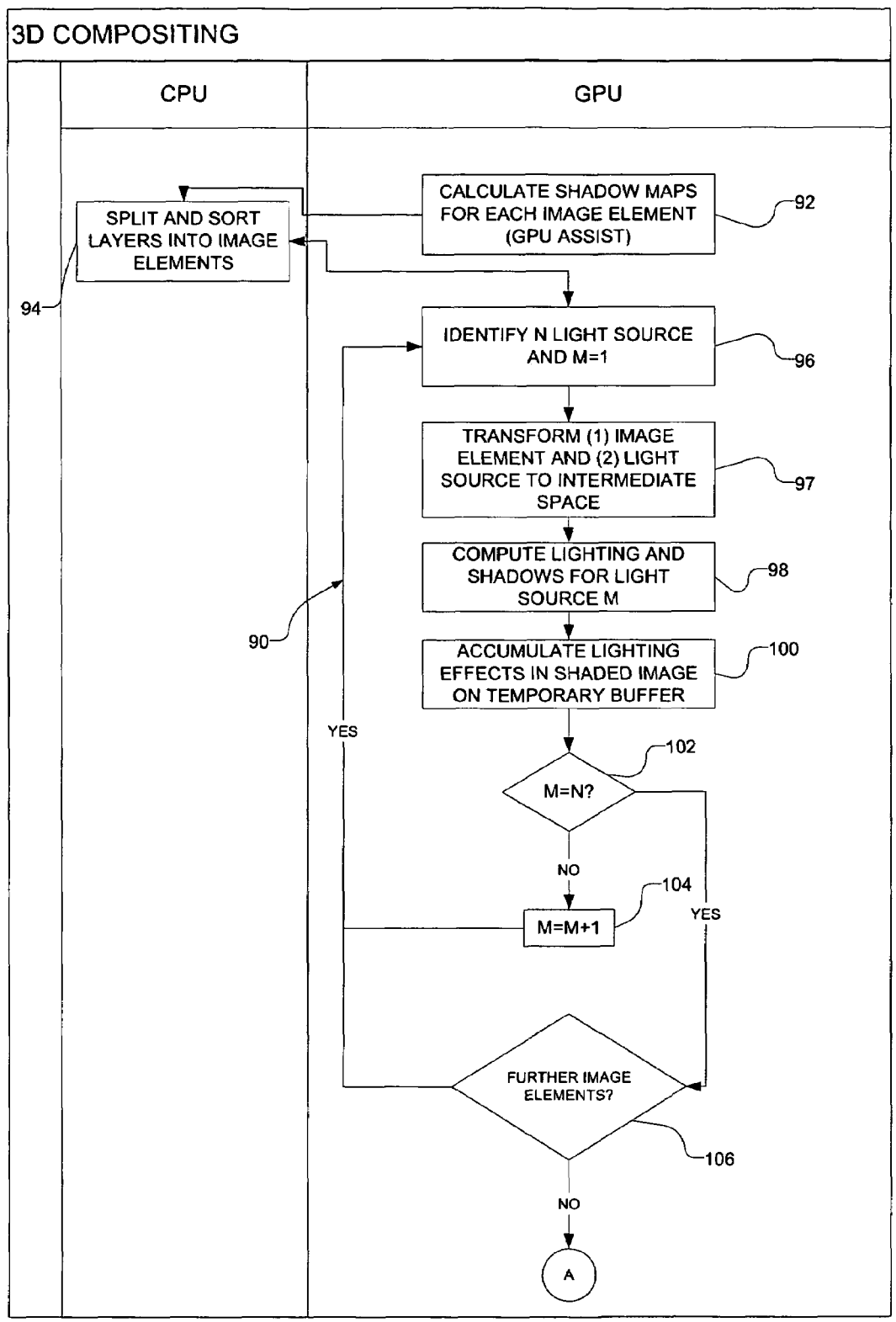
FIGS. 5 and 6 show a flowchart illustrating a method, according to an example embodiment of the present invention, to perform compositing of a three dimensional image on a GPU utilizing a reduced number of resources.
Figure 6:
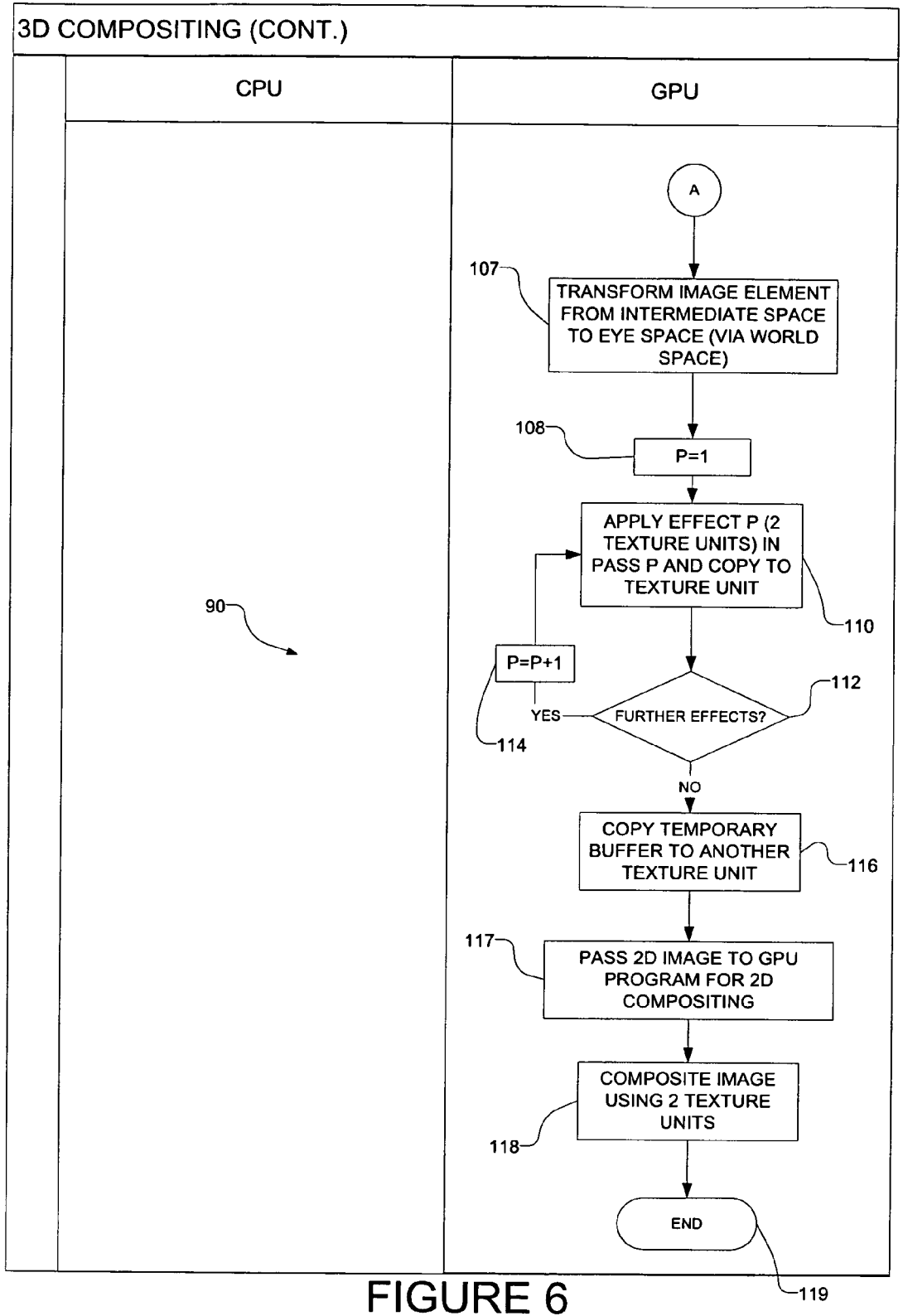

FIGS. 5 and 6 illustrate a flowchart depicting a method 90, according to the example embodiment of the present invention, to perform compositing of a three-dimensional image (e.g., a scene) on a computer system 10 that includes both a CPU 12 and a GPU 16. The illustrated flowchart distinguishes between operations performed on the CPU 12 and GPU 16.

Further, the example description of the techniques and algorithms below uses OpenGL nomenclature, for the purposes of illustration. It is recognized that other three-dimensional image processing mechanisms may utilize alternative nomenclature, and the present invention is of course not limited to the OpenGL mechanisms described.

The method 90 commences with a receipt of a three-dimensional digital image into application memory 48, and the identification of image elements (e.g., layers) within that digital image. In one embodiment, image elements may be identified by a user for inclusion within a composite image or scene that the user is constructing utilizing the image processing application 18. One example of such an image processing application is the After Effects 6.0 application, developed by Adobe Systems Incorporated of San Jose, Calif.

The method 90 now proceeds to block 92, where shadow maps are calculated for each of the image elements in the GPU. Once shadow maps are created, they are stored on the GPU as depth textures until needed during a lighting stage.

In one embodiment, the generation of shadow maps utilizes a known technique, with the additional constraint that texels with zero opacity do not cast shadows. This constraint may be incorporated into standard shadow mapping hardware utilizing an alpha test. Alpha testing, and a depth buffer (not shown) are activated, and thereafter the scene is rendered from the point of view of a light source. In one example embodiment implement utilizing OpenGL, as the alpha test is applied before the depth test, texels with zero opacity will be discarded before they can contribute to the depth map. The resulting depth map is termed a "shadow map" and represents the depths of image element from the viewpoint of the light source.

If the light source is a point light, then the scene may be rendered six times, once for each face of a cube surrounding the light source. The resulting textures are placed in six different depth textures. A perspective projection is used to calculate depths. If the light source is a spotlight, then only the direction along the spotlight direction is calculated. This assumes that the spotlight cone angle is less than 180°. For parallel lights, an orthographic projection parallel to the light source direction may be utilized. These shadow maps, when utilized, will be transformed to an intermediate space (e.g., the scaled space, defined in terms of the scaled-coordinate system 3).

Once the shadow maps have been calculated for the three-dimensional image at block 92, the method 90 progresses to block 94 to determine a sort order for the image elements that are included within the composite digital image. Accordingly, at block 94, the image elements are split and sorted, as will be described in further detail below, to ensure that a rendering algorithm (e.g., the Painter's algorithm) can be used to accurately render the composite image. Further details regarding the splitting and sourcing of image elements are provided below with respect to FIGS. 7 and 8.

Once the shadow maps have been generated at block 92, and the sorting order for the relevant image elements of the composite digital image have been determined at block 94, the method 90, at a high level, proceeds to render each image element into a temporary buffer 37 of the GPU 16 multiple times. In a first set of passes, lighting and shadows are rendered. On each pass the results of the pass are added to a previously rendered image. The result is a new image (hereinafter termed a "shaded image") that may be transformed to world-space and subject to further processing.

The computation of the lighting and shadowing for each image element is described at a high level with reference to FIG. 5, and without reference to the transformations between the various spaces described with reference to FIG. 1. Details regarding these transformations are provided with reference to subsequent figures. FIGS. 5 and 6 attempt to provide an overview of the high level processing operations that are performed.

Returning now to the flowchart shown in FIG. 5, the operations are depicted at blocks 96-104. For each image element, and for each light source, the relevant image element is rendered into the temporary buffer 37, utilizing the "add transfer mode" of OpenGL, in one example embodiment, to thereby accumulate lighting effects. Specifically, for a specific image element, a number (N) of lighting sources applicable to the image element is identified, and a first lighting source is identified for processing at block 96. At block 97, the image element is transformed to the intermediate space, in the manner described elsewhere in this document. This transform may be performed by a first transform module (or code) that forms part of a GPU program executed by the GPU. Further, at block 97, the identified light source is also transformed to the intermediate space. At block 98, lighting and shadowing are computed for the selected light source and, at block 100, the lighting and shadowing effects are accumulated in a "shaded" image in the temporary buffer 37. The operations at block 98 may be performed by a first lighting/shadow component of a GPU program executing on the GPU.

At decision block 102, a determination is made whether any further light sources are applicable to the image element. If not, the method 90 proceeds to block 104, where the next light source is identified, whereafter the method 90 loops back to block 96. Alternatively, should it be determined at decision block 102 that all light sources applicable to the image element have been processed, the method 90 progresses to decision block 106, where a determination is made whether any further image elements require processing. If so, the method 90 again loops back to block 96 for such a further image element.

If it is determined at decision block 106 that no further image elements require computing of lighting and shadowing, the method 90 progresses to the operations performed at blocks 108-114. In these operations, one or more effects (e.g., motion blur and trackmattes) are applied. Specifically, at block 107, the image element is transformed from the intermediate space to the eye space, via the world space before the processing of effects commences. This transform may be performed by a second transform module (or code) that forms part of a GPU program executed by the GPU. At block 108, a first effect (e.g., a trackmatte effect) is identified. At block 110, the identified effect is applied (e.g., utilizing two texture processing units) in a first pass by rendering the effect in the temporary buffer 37, whereafter the resultant image is transferred to an appropriate texture processing unit in the video memory 40. The identified effect may be applied by an effect component of a GPU program executing on the GPU.

At decision block 112, a determination is made as to whether further effects (e.g., motion blur) are applicable to the relevant image element. If so, the method 90 loops back to block 110 where a shaded image is rendered into the temporary buffer 37, calculating motion blur. The trackmatte, previously copied to the texture processing unit, may be used to compute an alpha channel.

At block 116, the temporary buffer 37 is copied to another texture processing unit. At blocks 117-118, the shaded image is then composited, utilizing a two-dimensional GPU compositing program (e.g., which may utilize two texture processing units). The method 90 then ends at block 119.

Figure 7:
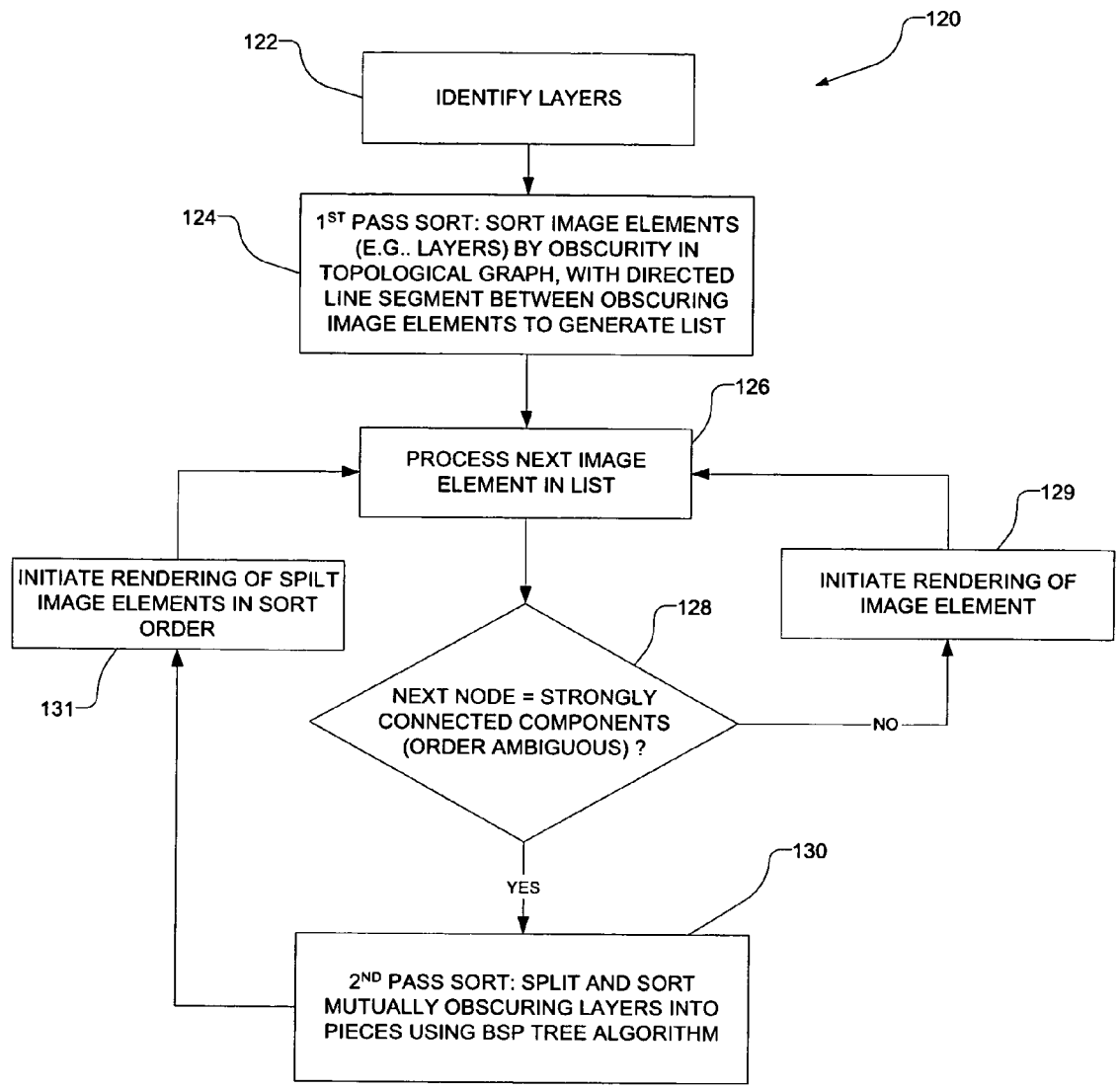
FIG. 7 is a flowchart depicting a method, according to one example embodiment of a present invention, to sort image elements (e.g., image layers) on a CPU for eventual compositing and rendering on an associated GPU.

FIG. 7 is a flowchart depicting a method 120, according to one example embodiment of a present invention, to sort image elements (e.g., including image layers) on a CPU 12 for eventual compositing and rendering on an associated GPU 16. Accordingly, the method 120, in one example embodiment, seeks to sort the image elements so as to provide a visibility ordering to such image elements and thereby to ensure that a correct picture results if the image elements are rendered in that order.

At a high level, the method 120 proposes processing a digital image data (e.g., associated with a three-dimensional scene) to identify a number of image elements (e.g., layers) to be included therein. For example, the image elements may be image elements that have been newly identified by a user of the image processing application 18. The identified image elements may also include image elements that the user has previously identify for inclusion within a composite digital image, and that have already been rendered as part of such a composite digital image. Newly-identified and previously-identified image elements will accordingly need to be rendered in a proper composite order, and taking into account the effects that may have been specified by a user, as well as a compositing modes that may been specified by a user for the various digital elements.

A first sort operation is then performed with respect to the identified image elements, based on obscurity among the identified image elements. A sort operation based on obscurity may be utilized to generate a "partially ordered set", in which the relative order of non-obscuring image elements is not crucial to further processing of a set of image elements. In an alternative embodiment, the first sort operation may be based on some other list priority algorithm that determines a visibility ordering of image elements. In such an embodiment, a "totally ordered set" man be generated, in which the obscuring and non-obscuring image elements of the set are provided with a relative ordering. For example, in such an alternative embodiment, the first sort operation may utilize a depth-sort algorithm which assumes that relative depth information regarding image elements is available. However, the example embodiment described below, in which sorting is based on obscurity, only requires that relative obscurity information is known or determinable.

A second sort operation is then performed with respect to the image elements, utilizing a Binary Space-Partitioning (BSP) tree algorithm. The first sort operation may include identifying non-obscuring, obscuring and mutually-obscuring image elements. The identification of the mutually-obscuring image elements may include clustering or grouping of image elements (e.g., by treating such a cluster of mutually-obscuring image elements as a single node in a topological graph) for which there is ambiguity regarding the relative ordering. This grouping or clustering of image elements is performed with a view to performing the second sort operation utilizing the BSP tree algorithm. In one embodiment, the image elements (including a clustering of mutually-obscuring image elements) may be represented by node in a topological graph (or alternatively entries in a partially sorted list), as will be described in further detailed below. For example, a cluster of mutually-obscuring image elements may be represented, prior to the application of a BSP tree algorithm, as a single node within the topological graph. The clustering of image elements may then be subject to a split and sort operation that is performed utilizing the BSP tree algorithm.

Returning to the method 120, which we described with reference to FIG. 7, an example embodiment of the present invention will now be described in which the image elements comprise image layers. Further, in this example embodiment, image layers are considered to be flat textured rectangles positioned in three-dimensional space by an affine transformation. Non-intersecting image layers may be sorted by methodologies and techniques in which the notion of obscurity plays a role. For example, consider that Layer A may obscure Layer B, if part of Layer A lies in front of Layer B, when viewed from a specific point in space (viewing point). Non-intersecting layers can be given a partial sorting order by providing Layer A with a greater ranking than Layer B, if Layer A obscures Layer B. Further, consider that problems may arise even if there are no intersecting layers. For instance, image layers can form a cycle where Layer A obscures Layer B, which obscures Layer C, which in turn obscures Layer A. In the case of intersecting layer images, portions of each layer image may obscure portions of other layer images.

The method 120 is described with reference to a simplified example of a three-dimensional image layer arrangement. In the example, various image layers, for the sake of simplicity, are assumed to extend parallel to the xy-plane. However, it will be appreciated that these image layers could be inclined with respect to the xy-plane, which would introduce further considerations into the handling of these image layers.

The method 120 commences at block 122, with the processing of a digital image (or input for the creation of a digital image) to identify one or more image elements, in the example form of image layers, to be rendered as part of a three-dimensional, composite image. These image layers may be identified and/or defined by a user of the image processing application 18 for inclusion within a three-dimensional digital image, merely for example. Alternatively, the image layers to be included within the composite three-dimensional image may be identified by an automated process, such as by other software.

Figure 8:
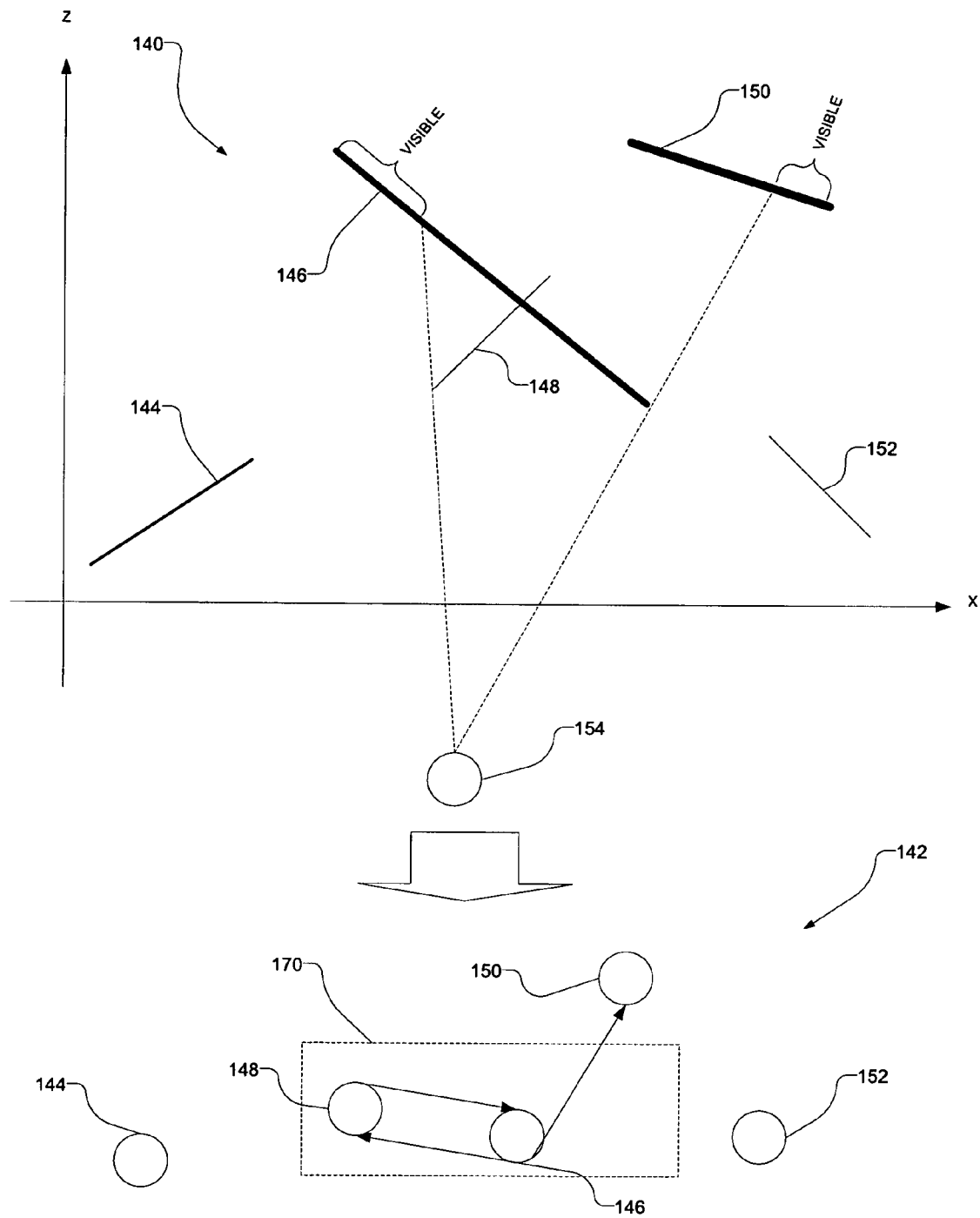
FIG. 8 illustrates an example arrangement of image elements within a three-dimensional environment.

FIG. 8 illustrates an example arrangement 140 of image layers within a three-dimensional environment. The view provided in FIG. 8 is from the vantage point of the y-axis, and accordingly shows the x- and the z-axes, and further displays the relative locations of image layers 144, 146, 148, 150 and 152. Further, FIG. 8 illustrates a viewing point 154, this being a point in space from which a view of the various image layers 144-152 will be rendered. Accordingly, at block 122, the sort module 20 of the image processing application 18 may identify the various image layers 144-152.

At block 124, having identified the various image layers, a first sort operation is performed to sort the image layers 144-152 (or groupings or clustering of layers) by obscurity within a topological graph. Within the topological graph, image layers may be represented by nodes (e.g., representative of a vertex of the image layer closest to the viewing point 154). For this first sort operation, image layers for which there exists ambiguity regarding a sort order (e.g., mutually-obscuring image layers) may be grouped or clustered, and initially represented by a single node within the topological graph.

Within the topological graph, directed line segments (or other directional indications) identify obscurity relationships between the represented image layers. Consider for example that a directed line segment would extend from Layer A to Layer B, if Layer A obscures Layer B. This direct line segment may also be bidirectional if Layer B also obscures Layer A.

Referring again to FIG. 8, an example topological graph 142 is shown as having been generated from the arrangement 140 of image layers 144-152. As illustrated, each of the image layers 144-152 is represented by a corresponding node. It will be noted that certain nodes (e.g., nodes 144 and 152) constitute singleton nodes as the corresponding image layers do not obscure, and are not obscured by, other image layers within the arrangement 140. However, other nodes within the topological graph 142 (e.g., nodes 146, 148 and 150) are shown to be connected in view of obscurity relationships between the corresponding image layers. Further, the nodes are connected by directed line segments (representative of data indicating an obscurity relationship) that provide information regarding the obscurity relationship between the corresponding image layers from the viewing point 154. The cluster or group of nodes 146 and 148 accordingly comprise a group 170 of strongly-connected nodes (or image elements), on account of the image elements being mutually obscuring. It will be appreciated that, within the group 170 of strongly-connected nodes (or image elements), some ambiguity regarding ordering exists. The method 120 seeks to resolve that ordering ambiguity.

At block 124, the sort module 20, and specifically the obscurity sorting algorithm 42, includes strongly-connected nodes within the topological graph 142 as a single node representation (e.g., a node representing the group 170). One example of a methodology that may be utilized to identify strongly-connected nodes (representative of obscurity image elements) can be found in the reference G. Chartrand, O. Oellermann, "Applied and Algorithmic Graph Theory", Chap. 11, McGraw-Hill.

Further, a technique for determining when one image layer obscures another can, in one example embodiment, be implemented utilizing a series of tests listed in the reference Foley and Van Dam, "Computer Graphics: Principles and Practice", Second Edition, pages 672-680, Addison-Wesley, 1990. These series of tests are designed to test trivial cases first. The last test (if all others yield inconclusive results) is to project the layers onto a view plane, clip one layer against another, and cast a ray through the intersection. If the intersection is empty, the image layers do not obscure each other. If there are obscuring image layers, the image layer which is closest to the ray origin obscures the other layers.

As mentioned above, at block 124, the sort module 20 locates strongly-connected components (or image elements). Such strongly-connected image layers, in one example embodiment, may be identified as image layers that are mutually-obscuring, either as a result of an intersection between the relevant layers or because the relevant image layers form a cycle. Following identification of these strongly-connected components (or image elements) at block 126, for which the rendering order is ambiguous, the ordering of these layers remains to be determined. However, for the purposes of the first sort operation formed at block 124, strongly-connected components are regarded as a single node.

Following the completion of the first sort operation at block 124, the application 18, and specifically the assembler module 22, begins to process instances of image element date 50 according to the sort order represented in the topological graph. At decision block 128, a determination is made whether a next node to be processed in the topological graph represents a group of strongly connected components. If not, at block 129, the rendering of an instance of image element data 50 associated with the node is initiated. On the other hand, should the next image to be processed represent a group of strongly connected components, the method proceeds to block 130

At block 130, the relevant strongly-connected components (e.g., image layers) are split into pieces (e.g., a further set of image elements or image layers) and are sorted. This splitting and sorting may be achieved utilizing a Binary Space-Partitioning (BSP) tree algorithm, such as that developed by Fuch, Kedem, and Naylor. More specifically, at block 130, the mutually-obscuring layers are split into pieces utilizing the BSP tree algorithm. For example, it should be noted that each image layer has a frontside and a backside. An image layer is picked to be the root of the BSP tree. The other image layers in the strong components are classified as either in front of, behind, or coincident with or spanning the root plane containing the root image layer. Those that are coincident with the root image layer cannot obscure and are furthermore not obscured by the root image layer. These coincident image layers are placed in a root list, and can be rendered in any order during compositing. Those that are entirely behind or entirely in front of the root plane are placed in lists in the nodes called "front" and "behind".

Those image layers that intersect with the root plane are split along the line of intersection, producing image elements (e.g., pieces) that lie entirely on one side of the root plane or the other. These pieces are then placed in the appropriate "front" or "behind" lists. The process is called recursively on the front and back nodes.

While having split the mutually obscuring image layers in the manner described above, the image elements in the resultant BSP tree can be sorted by a "depth first" search, traversing nodes back, route and then front.

Having split and sorted, the mutually obscuring layers at block 130, the method 120 then proceeds to initiate rendering of the split image elements generated at block 130, in the order determined by the BSP tree algorithm. The method 120 terminates when there are no further image elements to be processed at block 126.

A complete sort of image layers need not be completed at block 124 before the other operations of method 120 are initiated or even completed. For example, consider the example in which a first pass sort of image layers (by obscurity) commences at block 124, and a singleton node is located within the topological graph, prior to encountering any strongly-connected components. In this case, where there is no ambiguity regarding the rendering order of the particular image layer associated with a node, downstream processing of the relevant image element may be initiated. The sorting and identification of such "singleton nodes" within the topological graph 142 may continue until a clustering or group 170 of strongly-connected image elements is encountered. The second sort operation (e.g., as performed at block 130) may then be invoked to resolve the order ambiguity that exists within the group 170 of strongly-connected elements.

One advantage of using the two-part sorting approach described above with reference to FIG. 7 is efficiency. For example, were the BSP tree algorithm to be deployed without first attempting the first sort operation described at block 124, certain non-obscuring image layers may needlessly be split (e.g., those image layers that do not obscure another image layer, but nonetheless cross the plane of an image layer identified as the root plane of the BSP tree). Accordingly, the method 120 may result in less image elements being generated by the splitting operation of the BSP tree sorting algorithm than would have resulted if the BSP tree sorting algorithm were to be deployed alone, or ahead of another sorting methodology. A copy of a portion of the frame buffer 38 of the GPU 16 is made for each image element (e.g., each image layer) drawn. Accordingly, there is a performance advantage to having the GPU 16 process less image elements.

The description provided above with reference to FIG. 5 of the computation of lighting and shadowing with respect to each image element provided a high level overview. A description is now provided of the various transforms that are performed, in an example embodiment of the present invention, between the spaces defined by the coordinate systems described with reference to FIG. 1, in order to compute lighting and shadowing within a three-dimensional image.

As previously noted, in order to correctly compute lighting and shadowing, consideration is to be given to the non-uniformed scale (and skew) that is typically applied to three-dimensional images when they are transformed into a world-space. Object-space techniques typically assume a uniformed scaling in this transformation from the object-space to the world-space. Such an assumption assures that dot products used for light calculations in object-space are the same dot products when used in a world-space.

However, it should be noted that uniform scaling may not exist as the x- and y-axes of a three-dimensional image are scaled, while the scaling for the z-axis remains unchanged. In one embodiment, the present invention proposes to split the transformation from an object-space to a world-space into two parts, namely a scale and skew transform, and a rotate and translate transform. Specifically, the scale and skew transform is applied to an image element to move the image element from an object space to an intermediate space (e.g., the scaled space, defined by a scaled-coordinate system 3). Accordingly, the intermediate space may be regarded, in an example embodiment, as a space obtained from an object-space by a scale and skew transformation. Lighting and shadowing are then computed for a respective image element in the intermediate space.

A resultant shaded image is then transformed from the intermediate space to a world-space, defined by a world-coordinate system 4 utilizing a rigid transform. In the world-space, further effects (e.g., trackmattes and motion blur) can be applied, and compositing can take place. Because the dot products are invariant under rigid transformations, the lighting calculations in the scale-space are the same as those in the world-space.

Figure 9:
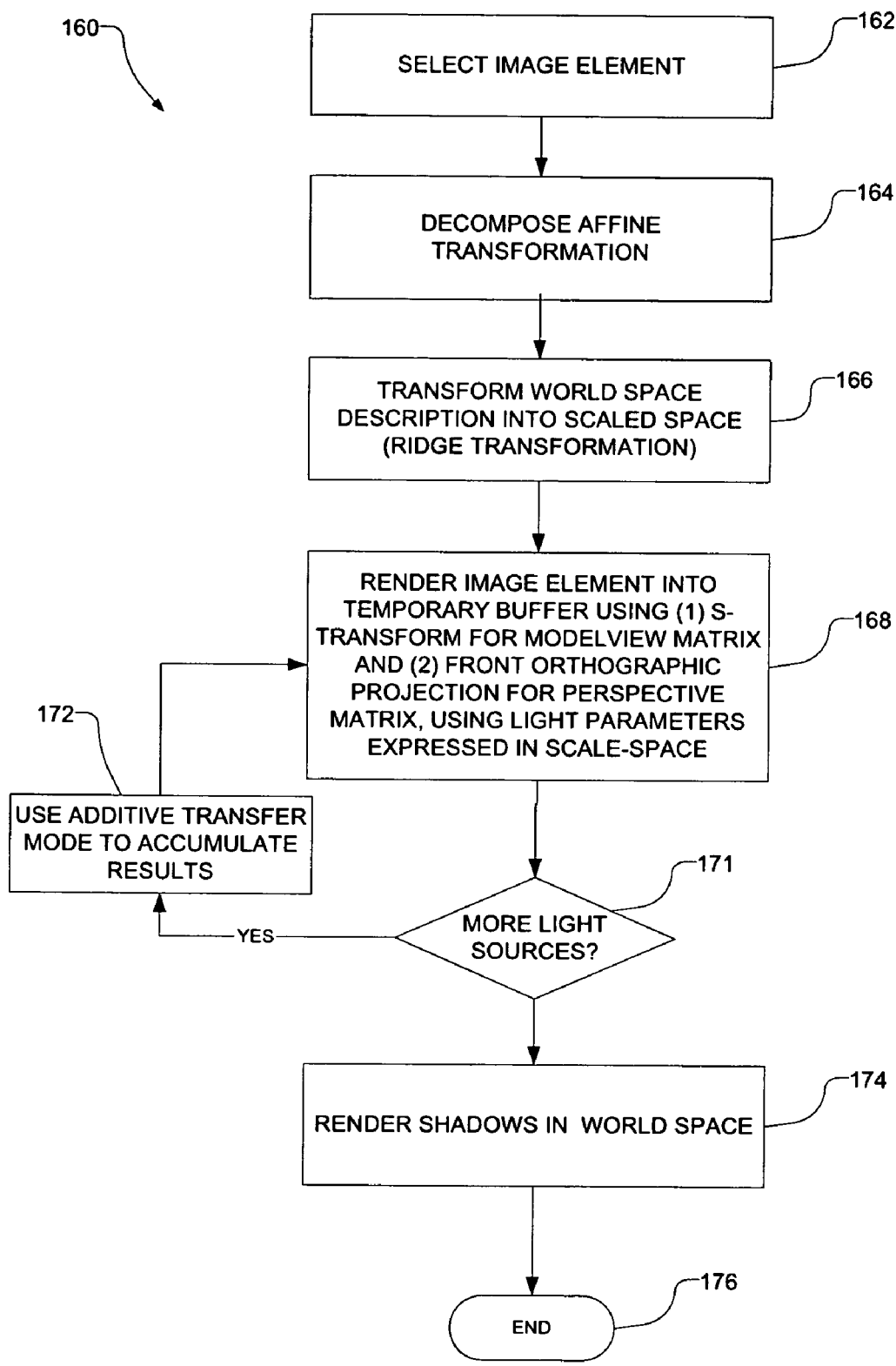
FIG. 9 is a flowchart illustrating a method, according to an example embodiment of the present invention, to compute lighting and shadowing with respect to an image element of a composite 3D image.
Figure 10:
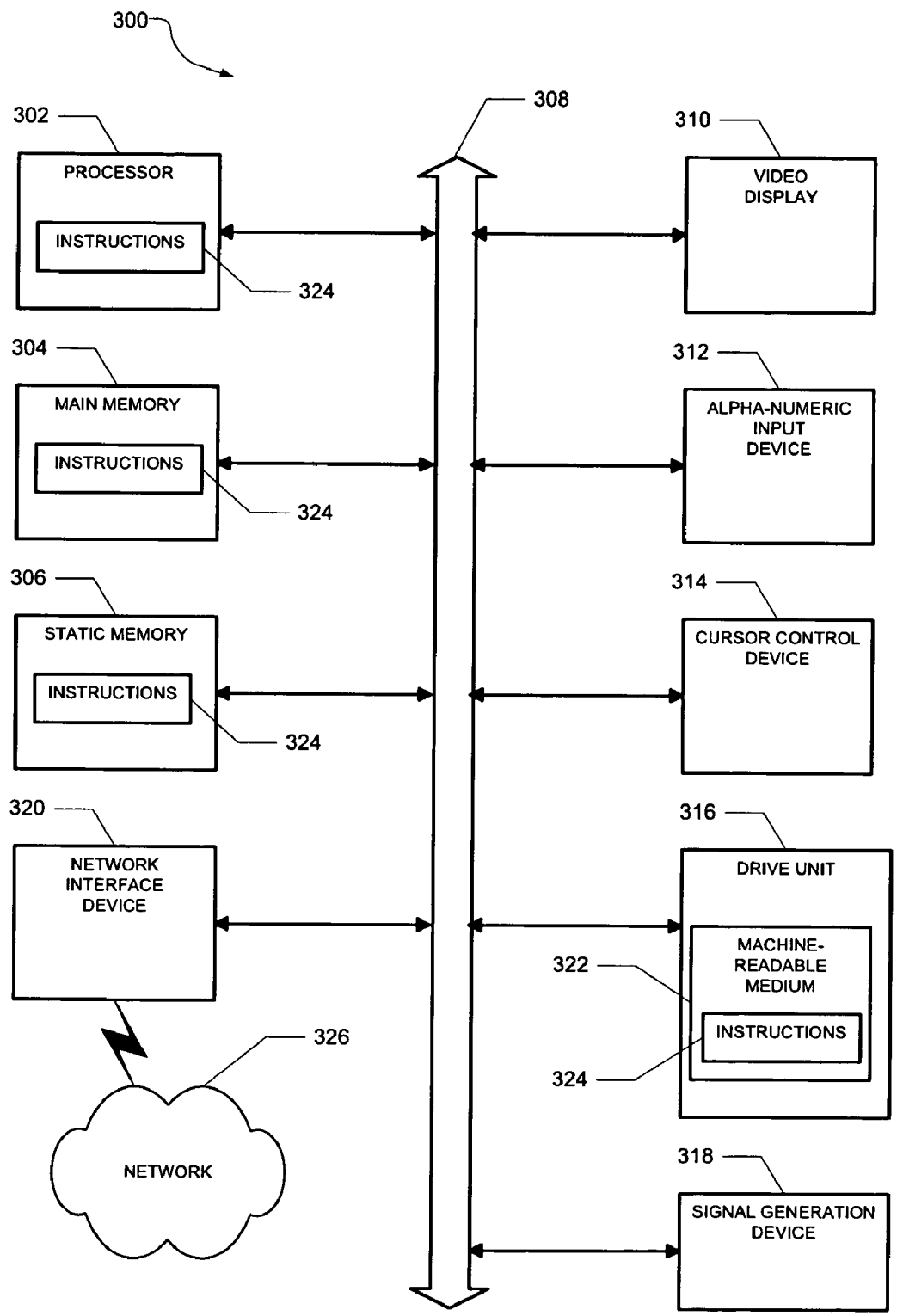
FIG. 10 is a diagrammatic representation of machine in the exemplary form of a computer system within which a set of instructions, for causing the machine to perform any one or more of the methodologies discussed herein, may be executed.

Further details regarding the computation of lighting and shadowing is now provided with reference to FIG. 9. FIG. 9 is a flowchart illustrating a method 160, according to an example embodiment of the present invention, to compute lighting and shadowing with respect to an image element of a composite 3D image. It should be noted that multiple light sources may be applicable to the composite 3 image. For example, OpenGL implementations may have up to eight different light sources.

At block 162, the relevant image element to be processed is identified. At block 164, for the identified image element, an affine transformation W is decomposed into the following form:

$$W=S*R*T,$$

where S is the scale and skew transform,

R is the rotate, and

T is the translate transform.

At block 166, the GPU 16 proceeds to transform a world-space description (expressed in terms of the world-coordinate system 4) of the position and direction of a specific light source. A camera's position is also transformed into the intermediate space (e.g., the scaled space defined in terms of the scaled-coordinate system 3). Each of these transforms is performed by multiplying the relevant descriptions by $T^{-1}*R^{-1}$. These transformations may be termed "rigid transformations." These transformations are performed so that lighting equations, applicable to the relevant light source, yield the same result as they would in the world-space (defined in terms of the world-coordinate system 4).

Having performed the rigid transformations at block 166, the method 160 proceeds to block 168. At block 168, the relevant image element is rendered into the temporary buffer 37. This rendering is performed utilizing the S-transform for the model view matrix, and also using a front orthographic projection for the perspective matrix. In one embodiment, the rendering is performed into a temporary buffer that is sufficiently large to handle the newly scaled image utilizing light parameters expressed in the intermediate (e.g., scaled) space.

At decision block 171, a determination is made as to whether any further light sources are applicable to the relevant image element. If so, a further pass is made for each such light source using the additive transfer mode of OpenGL to accumulate results, as shown at block 172. Perspective is not applied at this stage, as it will be applied later.

On the other hand, if no further light sources are applicable, as determined at decision block 171, the method 160 progresses to block 174. At block 174, shadows are rendered in world-space from the point of view of the light sources. To this end, the depth maps (or shadow maps) are transferred to the intermediate space (e.g., the scale-space) prior to using them. Specifically, the depth maps are first transformed to world-space by a changing of basis, whereafter the transform $T^{-1}*R^{-1}$ is applied.

The method 160 then terminates at 176. The end result of the above calculations is a temporary buffer 37, which is utilized as a new image element. The transform from the object-space to the world-space for this image element is R*T. The content of the temporary buffer 37 is then transferred to a texture processing unit, and will be utilized in place of the original image element for further processing. Further processing of the image element (as may occur at blocks 108-118) may include the application of one or more effects to the image element. Exemplary effects include motion blur and trackmattes. Further processing also includes compositing of the image, as described above with reference to block 118.

Turning first to motion blur as an exemplary effect, in one example embodiment, rather than rendering each image element multiple times in an accumulation buffer, an approximation technique is used. Specifically, for each vertex, a vector representing the motion of the vertex over the shutter angle is computed. This vector is transformed by the inverse of the model-view matrix in a vertex shader, and is passed to a fragment shader as a varying variable. Scaled versions of this vector are used in the fragment shader as offsets to the texture sampler, and the resultant texture samples are summed. If there is no motion blur, texture coordinates of the image element are used to sample the image element. While this technique may produce artifacts with fast rotation and perspective changes, it provides an advantage in that only a single varying variable is passed to the fragment shader. In contrast, passing a series of points for a fragment shader to sample may undesirably consume resources.

Turning now to the example of the "trackmatte" effect, a trackmatte is a layer that, in one example embodiment, modifies an alpha channel of an original image element (e.g., an original layer). A matte layer does not have to be aligned with an original image element. An arbitrary three dimensional affine transformation can be applied to a matte layer, before it is applied to the original image element. To render an image element for the trackmatte, the matte is rendered into the temporary buffer 37 using its three dimensional affine transform, a camera transform, and a perspective transform. This effectively puts the matte into screen space, defined by the screen-coordinate system 7. This buffer may then be copied to a texture processing unit. The image element may be rendered to another temporary buffer, the same size as the frame buffer 38, utilizing the R*T transform. A fragment shader will replace the alpha channel of the foreground image with a value computed from the background image.

In one embodiment, for the immediately above technique to function as desired, it may be necessary to supply a second set of textured coordinates for the foreground layer to be used on the viewport-sized matte texture. For this, a transform may be calculated that takes a vertex of the image element into screen space. This transform may then be composited with one that brings it into texture space.

The end result of the above technique is a two-dimensional image that, in one example scenario, may be the size of the viewport. This two-dimensional image may be copied to a texture processing unit to be used as the foreground image in a subsequent compositing stage. It is possible to reduce the number of pixels to be composited if only the axis aligned bounding box surrounding the pixels that were written at this step is copied. It is possible to further account for this possibly smaller texture when compositing utilizing a two-dimensional GPU program.

Turning now to compositing operations that may be performed at block 118, in an example embodiment, a last step in rendering of a three dimensional image (e.g., a scene) is the blending of a background color with a currently computed foreground color, utilizing a two dimensional operation. Before rendering commences, the portion of the frame buffer 38 that will be covered by the current foreground image is copied to a texture processing unit. The texture coordinates of the background image are computed for each foreground vertex by transforming the vertex, utilizing a translate and an orthographic projection matrix. This operation results in normalized device coordinates. The normalized device coordinates are then transformed to texture coordinates by a scale and a translate. The texture coordinates are again translated to the origin to account for the smaller sized texture that was originally copied, in an example embodiment.

A vertex subroutine for a compositing operation passes the vertex texture coordinates of the background image. The fragment shader uses the texture coordinates of the foreground and background textures to compute color channels for each period using appropriate blending equations, the colors are combined and transferred to the frame buffer 38.

In one embodiment, computing of an effect and performing compositing may be performed in a single pass within a GPU 16. However, such an embodiment may require the use of at least three texture processing units. An advantage of combining an effect process (e.g., applying a trackmatte) and compositing is that the texture coordinates of the background image and the trackmatte are the same, and a single interpolation unit may be utilized on both of these textures.

In conclusion, an example technique for compositing in a three-dimensional environment has been described. The exemplary technique may be utilized to handle different blending modes, as well as lighting, shadows, trackmattes, motion blur and other effects. The technique may be particularly well suited to operate on systems with a limited number of texture processing units. To this end, the technique proposes performing multiple passes using a limited number of texture processing units per pass. Further, an example technique proposes to account for non-uniform scale (and skew) that typically apply to three-dimensional images when they are transformed into a world-space. To this end, the example technique proposes splitting an object-space to the world-space transformation to two parts. A first scale/skew transform is applied to migrate an image element to an intermediate space, where lighting and shadowing are computed. A second transform is then performed to transfer a resultant shaded image to a world-space (e.g., by performing a rigid transformation). Once transformed into the world-space, other effects (e.g., trackmatte, motion blur) may be applied, and compositing can occur.

FIG. 11 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 one or more processors 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of embodying, a storing, encoding or carrying a set of instructions for execution by the machine and that cause the machine to perform any one or more of the methodologies described above, or that is capable of storing, encoding or carrying data structures utilized by or associated with such a set of instructions. The term "machine-readable medium" shall accordingly be taken to include, but not be limited to, solid-state memories and optical and magnetic media.

In the description, numerous specific details such as logic implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A number of figures show block diagrams of systems and apparatus for software, in accordance with some embodiments of the invention. A flow diagram illustrates the operations for software, in accordance with some embodiments of the invention. The operations of the flow diagram are described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. Therefore, the specification and drawings are to be regarded in an illustrative rather than a restrictive sense.

What is claimed is:

1. A method including:
   performing a first transform operation with respect to an image element to transform the image element from an object space, defined by an object coordinate system, to an intermediate space defined by an intermediate coordinate system;
   performing a first computational operation with respect to the image element in the intermediate space, wherein the first computational operation is one of a lighting and a shadowing computational operation;
   performing a second transform operation with respect to the image element to transform the image element from the intermediate space to a world space, defined by a world coordinate system; and
   performing a second computational operation with respect to the image element in the world space.

2. The method of claim 1, wherein the first transform operation is a scale and skew transform.

3. The method of claim 1, wherein the second transform operation is a rotate and translate transform.

4. The method of claim 1, wherein the second computational operation includes applying an effect to the image element.

5. The method of claim 1, wherein the second computational operation includes compositing the image element.

6. A machine readable medium embodying a set of instructions that, when executed by a machine, cause machine to perform the method of claim 1.

7. A system including:
- a first transform module to perform a first transform operation with respect to an image element, the first transform operation to transform the image element from an object space, defined by an object coordinate system, to an intermediate space defined by an intermediate coordinate system;
- a first GPU program component to perform a first computational operation with respect to the image element in the intermediate space, wherein the first computational operation is one of a lighting and a shadowing computational operation;
- a second transform module to perform a second transform operation with respect to the image element, the second transform operation to transform the image element from the intermediate space to a world space, defined by a world coordinate system; and
- a second GPU program component to perform a second computational operation with respect to the image element in the world space.

8. The system of claim 7, wherein the first transform module is to perform a scale and skew transform.

9. The system of claim 7, wherein the second transform module is to perform is a rotate and translate transform.

10. The system of claim 7, wherein the second GPU program component is to apply an effect to the image element.

11. The system of claim 7, wherein the second GPU program component is to composite the image element.

* * * * *